US006401186B1

(12) United States Patent
Blodgett

(10) Patent No.: US 6,401,186 B1
(45) Date of Patent: *Jun. 4, 2002

(54) CONTINUOUS BURST MEMORY WHICH ANTICIPATES A NEXT REQUESTED START ADDRESS

(75) Inventor: Greg A. Blodgett, Nampa, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,139

(22) Filed: Jul. 3, 1996

(51) Int. Cl.$^7$ .............................................. G06F 12/06
(52) U.S. Cl. ...................................... 711/213; 711/218
(58) Field of Search ................................. 711/105, 137, 711/204, 168, 169, 213, 217, 218; 365/233

(56) References Cited

U.S. PATENT DOCUMENTS

| | | | |
|---|---|---|---|
| 4,344,156 A | 8/1982 | Eaton et al. ................. | 365/203 |
| 4,484,308 A | 11/1984 | Lewandowski et al. ...... | 365/900 |
| 4,519,028 A | 5/1985 | Olsen et al. ................. | 364/200 |
| 4,562,555 A | 12/1985 | Ouchi et al. ................. | 365/233 |
| 4,567,579 A | 1/1986 | Patel et al. ................... | 365/189 |
| 4,575,825 A | 3/1986 | Ozaki et al. ................. | 365/189 |
| 4,603,403 A | 7/1986 | Toda ........................... | 365/189 |
| 4,618,947 A | 10/1986 | Tran et al. ................... | 365/230 |
| 4,649,522 A | 3/1987 | Kirsch ......................... | 365/189 |
| 4,685,089 A | 8/1987 | Patel et al. ................... | 365/233 |
| 4,707,811 A | 11/1987 | Takemae et al. ............. | 365/239 |
| 4,788,667 A | 11/1988 | Nakano ....................... | 365/193 |
| 4,851,990 A | 7/1989 | Johnson et al. .............. | 364/200 |

(List continued on next page.)

FOREIGN PATENT DOCUMENTS

| | | | |
|---|---|---|---|
| DE | 195 07 562 | 9/1995 | |
| EP | 0547890 | 6/1993 | |
| JP | 5-89663 | 4/1993 | ......... G11C/11/401 |
| JP | 5-282859 | 10/1993 | |
| JP | 06060658 | 3/1994 | |
| JP | 6-333393 | 12/1994 | |

OTHER PUBLICATIONS

Sunaga, Toshio et al., "An Eight–bit Prefetch Circuit for High–Bandwidth DRAM's", IEEE Journal of Solid–State Circuits, vol. 32, No. 1, pp. 105–110, 1996.*

""DRAM 1 Meg × 4 DRAM 5VEDO Page Mode",", *1995 DRAM Data Book,*, pp. 1–1 thru 1–30,, (Micron Technology, I).

""Rossini, Pentium, PCI–ISA, Chip Set"", *Symphony Laboratories,*, entire book, (Jun. 1995).

"4DRAM 1991", *Toshiba America Electronic Components, Inc.*, pp. A–137–A–159.

"Application Specific DRAM", *Toshiba America Electronic Components, Inc.*, C178, C–260, C 218, (1994).

"Burst DRAM Function & Pinout", *Oki Electric Ind., Co., Ltd.*, 2nd Presentation, Item # 619, (Sep. 1994).

(List continued on next page.)

*Primary Examiner*—Eddie P. Chan
*Assistant Examiner*—Gary J. Portka
(74) *Attorney, Agent, or Firm*—Schwegman, Lundberg, Woessner, Kluth, P.A.

(57) ABSTRACT

A system is described which uses a burst access memory and a memory controller to anticipate the memory address to be used in future data read operations as requested by a microprocessor. Either the memory controller or the memory device initiates a burst read operation starting at a memory address generated thereby. The microprocessor can, therefore, wait to initiate a data read without suffering a time delay.

20 Claims, 7 Drawing Sheets

U.S. PATENT DOCUMENTS

| | | | |
|---|---|---|---|
| 4,870,622 A | 9/1989 | Aria et al. | 365/230 |
| 4,875,192 A | 10/1989 | Matsumoto | 365/193 |
| 4,926,314 A | 5/1990 | Dhuey | 364/200 |
| 4,985,641 A | 1/1991 | Nagayama et al. | 307/272.3 |
| 5,058,066 A | 10/1991 | Yu | 365/189.05 |
| 5,126,975 A | 6/1992 | Handy et al. | 365/230 |
| 5,146,582 A | 9/1992 | Begun | 395/500 |
| 5,237,689 A | 8/1993 | Behnke | 395/700 |
| 5,253,357 A | 10/1993 | Allen et al. | 395/425 |
| 5,267,200 A | 11/1993 | Tobita | 365/189 |
| 5,268,865 A | 12/1993 | Takasugi | 365/189 |
| 5,280,594 A | 1/1994 | Young et al. | 395/425 |
| 5,301,278 A | 4/1994 | Bowater et al. | 395/275 |
| 5,305,284 A | 4/1994 | Iwase | 365/238.5 |
| 5,309,398 A | 5/1994 | Nagase et al. | 365/189.05 |
| 5,319,759 A | 6/1994 | Chan | 395/400 |
| 5,323,352 A | 6/1994 | Miyata et al. | 365/222 |
| 5,325,330 A | 6/1994 | Morgan | 365/189.05 |
| 5,325,502 A | 6/1994 | McLaury | 395/425 |
| 5,331,471 A | 7/1994 | Matsumoto et al. | 365/189.05 |
| 5,333,305 A | 7/1994 | Neufeld | 395/575 |
| 5,349,566 A | 9/1994 | Merritt et al. | 365/233.5 |
| 5,357,469 A | 10/1994 | Sommer et al. | 365/193 |
| 5,373,227 A | 12/1994 | Keeth | 323/313 |
| 5,379,261 A | 1/1995 | Jones, Jr. | 365/230 |
| 5,392,239 A | 2/1995 | Margulis et al. | 365/189 |
| 5,394,535 A | 2/1995 | Ohuchi | 395/425 |
| 5,410,670 A | 4/1995 | Hansen et al. | 395/425 |
| 5,426,606 A | 6/1995 | Takai | 365/189.05 |
| 5,452,261 A | 9/1995 | Chung et al. | 365/233 |
| 5,454,107 A | 9/1995 | Lehman et al. | 395/480 |
| 5,457,659 A | 10/1995 | Schaefer | 365/222 |
| 5,483,498 A | 1/1996 | Hotta | 365/233.5 |
| 5,485,428 A | 1/1996 | Lin | 365/221 |
| 5,487,043 A | 1/1996 | Furutani et al. | 365/203 |
| 5,499,355 A * | 3/1996 | Krishnamohan et al. | 711/204 |
| 5,513,148 A | 4/1996 | Zager | 365/233 |
| 5,522,064 A | 5/1996 | Aldereguia et al. | 395/550 |
| 5,526,320 A | 6/1996 | Zagar et al. | 365/233.5 |
| 5,568,445 A | 10/1996 | Park et al. | 365/233 |
| 5,587,964 A | 12/1996 | Rosich et al. | 365/238.5 |
| 5,592,435 A | 1/1997 | Mills et al. | 365/233.5 |
| 5,640,507 A | 6/1997 | Lipe | 395/183.01 |
| 5,651,130 A * | 7/1997 | Hinkle et al. | 711/105 |
| 5,654,932 A | 8/1997 | Rao | 365/320.03 |
| 5,661,695 A | 8/1997 | Zagar et al. | 365/233.5 |
| 5,666,321 A | 9/1997 | Schaefer | 365/233.5 |
| 5,668,773 A | 9/1997 | Zagar et al. | 365/233 |
| 5,610,864 A | 10/1997 | Manning | 365/193 |
| 5,675,549 A | 10/1997 | Ong et al. | 365/233.5 |
| 5,682,354 A | 10/1997 | Manning | 365/233.5 |
| 5,696,732 A | 12/1997 | Zagar et al. | 365/233.5 |
| 5,717,654 A | 2/1998 | Manning | 365/233.5 |
| 5,721,859 A * | 2/1998 | Manning | 365/233 |
| 5,729,503 A | 3/1998 | Manning | 365/233.5 |
| 5,729,504 A * | 3/1998 | Cowles | 365/236 |
| 5,729,709 A * | 3/1998 | Harness | 365/230.03 |
| 5,751,656 A | 5/1998 | Schaefer | 365/233.5 |
| 5,757,703 A | 5/1998 | Merritt et al. | 365/189.05 |
| 5,784,331 A | 7/1998 | Lysinger | 365/230.06 |
| 5,802,010 A | 9/1998 | Zagar et al. | 365/233.5 |
| 5,825,691 A | 10/1998 | McClure | 365/189.01 |
| 5,848,018 A | 12/1998 | McClure | 365/201 |
| 5,854,911 A * | 12/1998 | Watkins | 712/207 |
| 5,946,265 A | 8/1999 | Cowles | 365/233 |
| 5,963,504 A | 10/1999 | Manning | 365/233.5 |
| 6,006,339 A | 12/1999 | McClure | 713/500 |
| 6,061,296 A | 5/2000 | Ternullo, Jr. et al. | 365/233 |
| 6,130,843 A | 10/2000 | Lee | 365/189.05 |
| 6,172,935 B1 | 1/2001 | Wright et al. | 365/233 |

OTHER PUBLICATIONS

"Hyper Page Mode DRAM", *8029 Electronic Engineering*, 66, No. 813, Woolwich, London, GB, pp. 47–48, (Sep. 1994).

"Mosel–Vitelic V53C8257H DRAM Specification Sheet, 20 pages, Jul. 2, 1994".

"Pipelined Burst DRAM", *Toshiba, JEDEC JC 42.3 Hawaii*, (Dec. 1994).

"Samsung Synchronous DRAM", *Samsung Electronics*, pp. 1–16, (Mar. 1993).

"Synchronous DRAM 2 MEG × 8 SDRAM", *Micron Semiconductor, Inc.*, pp. 1–18 (Mar., 1994).

Dave Bursky, "Novel I/O Options and Innovative Architectures Let DRAMs Achieve SRAM Performance; Fast DRAMS can be swapped for SRAM Caches", *Electronic Design*, vol. 41, No. 15, Cleveland, Ohio, pp. 55–67, (Jul. 22, 1993).

Shiva P. Gowni, et al., "A 9NS, 32K × 9, BICMOS TTL Synchronous Cache RAM With Burst Mode Access", *IEEE*, Custom Integrated Circuits Conference, pp. 781–784, (Mar. 3, 1992).

*1996 DRAM Data Book*, Micron Technology, Inc., pp. 1–1 to 1–52, (1996).

"1995 DRAM Data Book", Micron Technology, Inc., (1995) 4–1 to 4–42.

"Burst EDO DRAM Information", Micron Technology, Inc., 1–126, (Sep. 1995).

"Burst Edo Memory Device Address Counter", *PCT Application PCT/US95/16656*, (Dec. 21, 1995), Intl. Pub. No. WO 96/20479.

"Integrated Circuit Technical Data–262, 144 Words ×8 Bits Multiport DRAM", Toshiba Corp., TC52826TS/Z/FT/TR, TEN. Rev.2.1, pp. 1–63, (1980).

"Micron Semiconductor, Inc.", *1994 DRAM Data Book*, entire book.

"Synchronous DRAM 4 Meg ×4 SDRAM", Micron Semiconductor, Inc., pp. 1–42, (1983).

* cited by examiner

FIG. 2

| Burst Length | Starting Column Address | | | Linear | Interleave |
|---|---|---|---|---|---|
| | A2 | A1 | A0 | | |
| 2 | V | V | 0 | 0-1 | 0-1 |
| | V | V | 1 | 1-0 | 1-0 |
| 4 | V | 0 | 0 | 0-1-2-3 | 0-1-2-3 |
| | V | 0 | 1 | 1-2-3-0 | 1-0-3-2 |
| | V | 1 | 0 | 2-3-0-1 | 2-3-0-1 |
| | V | 1 | 1 | 3-0-1-2 | 3-2-1-0 |
| 8 | 0 | 0 | 0 | 0-1-2-3-4-5-6-7 | 0-1-2-3-4-5-6-7 |
| | 0 | 0 | 1 | 1-2-3-4-5-6-7-0 | 1-0-3-2-5-4-7-6 |
| | 0 | 1 | 0 | 2-3-4-5-6-7-0-1 | 2-3-0-1-6-7-4-5 |
| | 0 | 1 | 1 | 3-4-5-6-7-0-1-2 | 3-2-1-0-7-6-5-4 |
| | 1 | 0 | 0 | 4-5-6-7-0-1-2-3 | 4-5-6-7-0-1-2-3 |
| | 1 | 0 | 1 | 5-6-7-0-1-2-3-4 | 5-4-7-6-1-0-3-2 |
| | 1 | 1 | 0 | 6-7-0-1-2-3-4-5 | 6-7-4-5-2-3-0-1 |
| | 1 | 1 | 1 | 7-0-1-2-3-4-5-6 | 7-6-5-4-3-2-1-0 |

CONTINUOUS BURST MEMORY WHICH ANTICIPATES A NEXT REQUESTED START ADDRESS

TECHNICAL FIELD OF THE INVENTION

The present invention relates generally to memory devices and in particular the present invention relates to burst access memory devices.

BACKGROUND OF THE INVENTION

There is a demand for faster, higher density, random access memory integrated circuits which provide a strategy for integration into today's personal computer systems. In an effort to meet this demand, numerous alternatives to the standard DRAM architecture have been proposed. One method of providing a longer period of time when data is valid at the outputs of a DRAM without increasing the fast page mode cycle time is called Extended Data Out (EDO) mode. In an EDO DRAM the data lines are not tri-stated between read cycles. Instead, data is held valid after CAS* goes high until sometime after the next CAS* low pulse occurs, or until RAS* or the output enable (OE*) goes high. Determining when valid data will arrive at the outputs of a fast page mode or EDO DRAM can be a complex function of when the column address inputs are valid, when CAS* falls, the state of OE* and when CAS* rose in the previous cycle. The period during which data is valid with respect to the control line signals (especially CAS*) is determined by the specific implementation of the EDO mode, as adopted by the various DRAM manufacturers.

Yet another type of memory device is a burst EDO memory which adds the ability to address one column of a memory array and then automatically address additional columns in a pre-determined manner without providing the additional column addresses on external address lines. These memory devices use a column access input to access the memory array columns.

A latency is experienced during a read operation. That is, output data is not immediately available following an externally applied column address. The latency is required to prepare, access and sense data stored at the new address.

Regardless of the type of memory, a processor receiving data from a memory ay delay a new memory read operation until a prior read is complete. This delay results in a delay of new valid data. For the reasons stated above, and for other reasons stated below which will become apparent to those skilled in the art upon reading and understanding the present specification, there is a need in the art for a memory system which anticipates the address of a new memory read operation to reduce or eliminate delays in valid data.

SUMMARY OF THE INVENTION

The above mentioned problems with accessing data stored in a memory device and other problems are addressed by the present invention and which will be understood by reading and studying the following specification. A system is described which anticipates the memory address to be used in future data read operations as requested by a microprocessor.

In particular, the present invention describes a system comprising a synchronous memory device having addressable memory cells, a microprocessor coupled to the synchronous memory device for data communication with the addressable memory cells, the microprocessor further initiating a data read operation at a first memory cell address. A memory controller is connected to the microprocessor and the synchronous memory device. The memory controller produces a second memory cell address and initiates a read operation in anticipation of a second data read operation at a new memory cell address provided from the microprocessor.

Alternatively, a system is described which comprises a microprocessor, a burst access memory having addressable memory cells for providing data in response to a read request from the microprocessor, the read request including a start memory cell address, and address generation circuitry included in the burst access memory for generating a memory cell address and initiating a read operation in anticipation of a read request from the microprocessor.

In still another embodiment, a method of continuously outputting data from a synchronous memory device is described. The method comprises the steps of providing a read request from a microprocessor, the read request including a memory cell start address for the synchronous memory device. The method further including the steps of initiating a read operation using a memory controller in response to the read request, and outputting data from the synchronous memory device in response to the memory controller. A new memory address is generated in anticipation of a second read request from the microprocessor, the second read request including a second memory cell start address. Finally, a second read operation is initiated and data is output from the synchronous memory device starting at the new memory address.

BRIEF DESCRIPTION OF THE DRAWINGS

FIG. 2 is a table which shows linear and interleaved addressing sequences;

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

Figure 1:
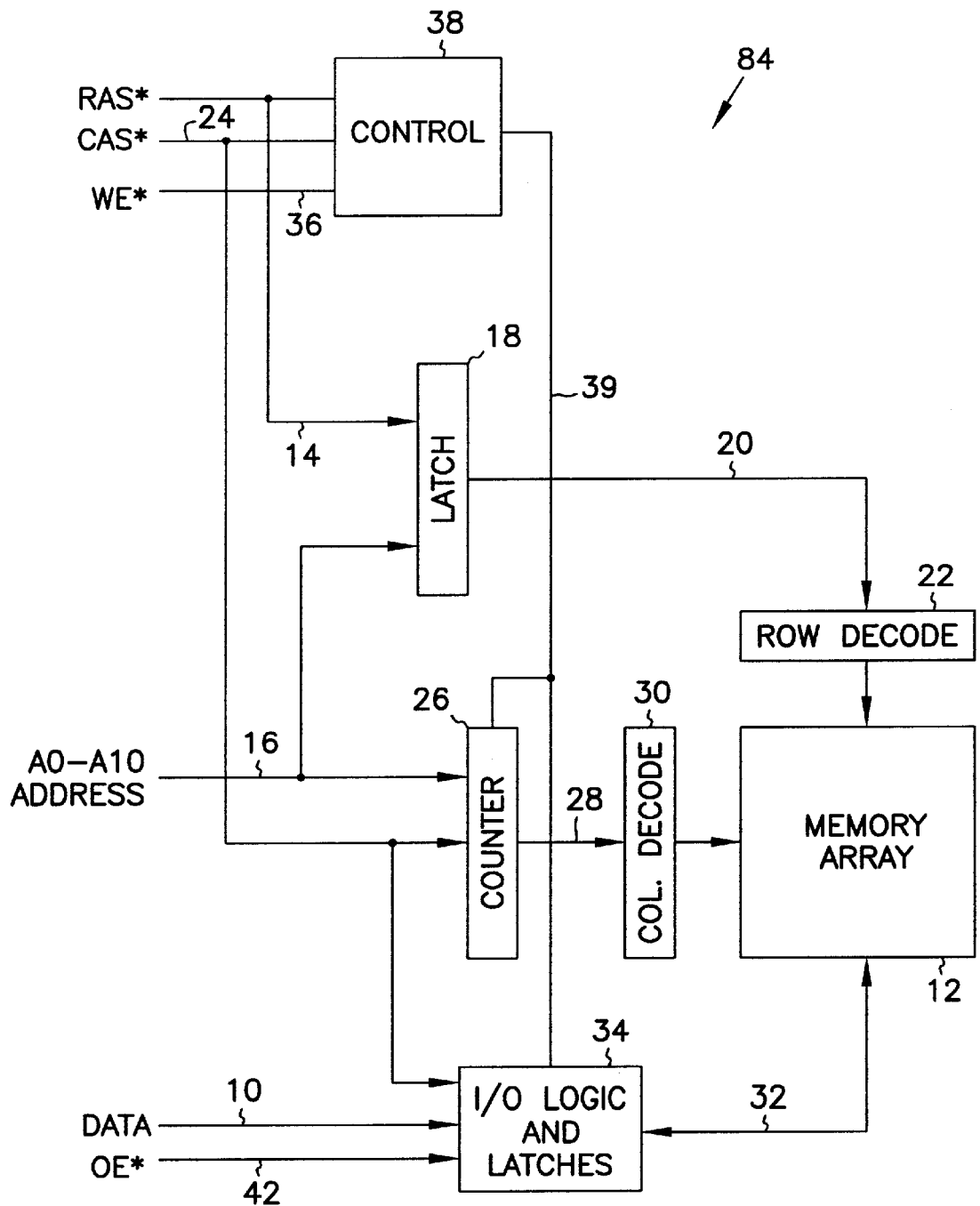
FIG. 1 is a burst access memory device.

FIG. 1 is a schematic representation of a sixteen megabit device 84 designed to operate in a burst access mode. The device is organized as a 2 Meg×8 burst EDO DRAM having an eight bit data input/output path 10 providing data storage for 2,097,152 bytes of information in the memory array 12. An active-low row address strobe (RAS*) signal 14 is used to latch a first portion of a multiplexed memory address, from address inputs AO through A16, in latch 18. The latched row address 20 is decoded in row decoder 22. The decoded row address is used to select a row of the memory array 12. An active-low column address strobe (CAS*) signal 24 is used to latch a second portion of a memory address from address inputs 16 into column address counter 26. The latched column address 28 is decoded in column address decoder 30. The decoded column address is used to select a column of the memory array 12.

In a burst read cycle, data within the memory array located at the row and column address selected by the row and column address decoders is read out of the memory array and sent along data path 32 to output latches 34. Data 10 driven from the burst EDO DRAM may be latched external to the device in synchronization with a clock signal after a predetermined number of clock cycle delays (latency). For a two cycle latency design, the first CAS* falling edge is used to latch the initial address for the burst access. The first burst data from the memory is driven from the memory after the second CAS* falling edge, and remains valid through the third CAS* falling edge. Once the memory device begins to output data in a burst read cycle, the output drivers 34 will continue to drive the data lines without tri-stating the data outputs during CAS* high intervals dependent on the state of the output enable and write enable (OE* and WE*) control lines, thus allowing additional time for the system to latch the output data. Once a row and a column address are selected, additional transitions of the CAS* signal are used to advance the column address within the column address counter in a predetermined sequence. The time at which data will be valid at the outputs of the burst EDO DRAM is dependent only on the timing of the CAS* signal provided that OE* is maintained low, and WE* remains high.

The address may be advanced linearly, or in an interleaved fashion for maximum compatibility with the overall system requirements. FIG. 2 is a table which shows linear and interleaved addressing sequences for burst lengths of 2, 4 and 8 cycles. The "V" for starting addresses A1 and A2 in the table represent address values that remain unaltered through the burst sequence. The column address may be advanced with each CAS* transition, or each pulse. When the address is advanced with each transition of the CAS* signal, data is also driven from the part after each transition following the device latency which is then referenced to each edge of the CAS* signal. This allows for a burst access cycle where the CAS* toggles only once (high to low or low to high) for each memory cycle.

In the burst access memory device, each new column address from the column address counter is decoded and is used to access additional data within the memory array without the requirement of additional column addresses being specified on the address inputs 16. This burst sequence of data will continue for each CAS* falling edge until a predetermined number of data accesses equal to the burst length has occurred. A CAS* falling edge received after the last burst address has been generated will latch another column address from the address inputs 16 if CAS* is low and a new burst sequence will begin. Read data is latched and output with each falling edge of CAS* after the first CAS* latency. For a burst write cycle, data 10 is latched in input data latches 34. Data targeted at the first address specified by the row and column addresses is latched with the CAS* signal when the first column address is latched (write cycle data latency is zero). Other write cycle data latency values are possible; however, for today's memory systems, zero is preferred. Additional input data words for storage at incremented column address locations are latched by CAS* on successive CAS* pulses. Input data from the input latches 34 is passed along data path 32 to the memory array where it is stored at the location selected by the row and column address decoders. As in the burst read cycle previously described, a predetermined number of burst access writes will occur without the requirement of additional column addresses being provided on the address lines 16. After the predetermined number of burst writes has occurred, a subsequent CAS* will latch a new beginning column address, and another burst read or write access will begin.

The write enable signal is used in burst access cycles to select read or write burst accesses when the initial column address for a burst cycle is latched by CAS*. WE* low at the column address latch time selects a burst write access. WE* high at the column address latch time selects a burst read access. A low to high transition within a burst write access will terminate the burst access, preventing further writes from occurring. A high to low transition on WE* within a burst read access will likewise terminate the burst read access and will place the data output 10 in a high impedance state. Transitions of the WE* signal may be locked out during critical timing periods within an access cycle in order to reduce the possibility of triggering a false write cycle. After the critical timing period, the state of WE* will determine whether a burst access continues, is initiated, or is terminated. Termination of a burst access resets the burst length counter and places the DRAM in a state to receive another burst access command. Both RAS* and CAS* going high during a burst access will also terminate the burst access cycle placing the data drivers in a high impedance output state, and resetting the burst length counter. The burst length counter is preferably included in the control logic circuit 38. The burst length counter is used to keep track of how many cycles are performed in a burst access, and is not the same as the address counter which generates the burst addresses for the memory array.

A minimum write enable pulse width is only required when it is desired to terminate a burst read and then begin another burst read, or terminate a burst write prior to performing another burst write with a minimum delay between burst accesses. In the case of burst reads, WE* will transition from high to low to terminate a first burst read, and then WE* will transition back high prior to the next falling edge of CAS* in order to specify a new burst read cycle. For burst writes, WE* would transition high to terminate a current burst write access, then back low prior to the next falling edge of CAS* to initiate another burst write access.

A basic implementation of the device of FIG. 1 may include a fixed burst length of 4, a fixed CAS* latency of 2 and a fixed interleaved sequence of burst addresses.

The burst access memory has been described with reference to several embodiments. Just as fast page mode DRAMs and EDO DRAMs are available in numerous configurations including x1, x4, x8 and x16 data widths, and 1 Megabit, 4 Megabit, 16 Megabit and 64 Megabit densities; the burst access memory device may take the form of many different memory organizations.

Figure 3:
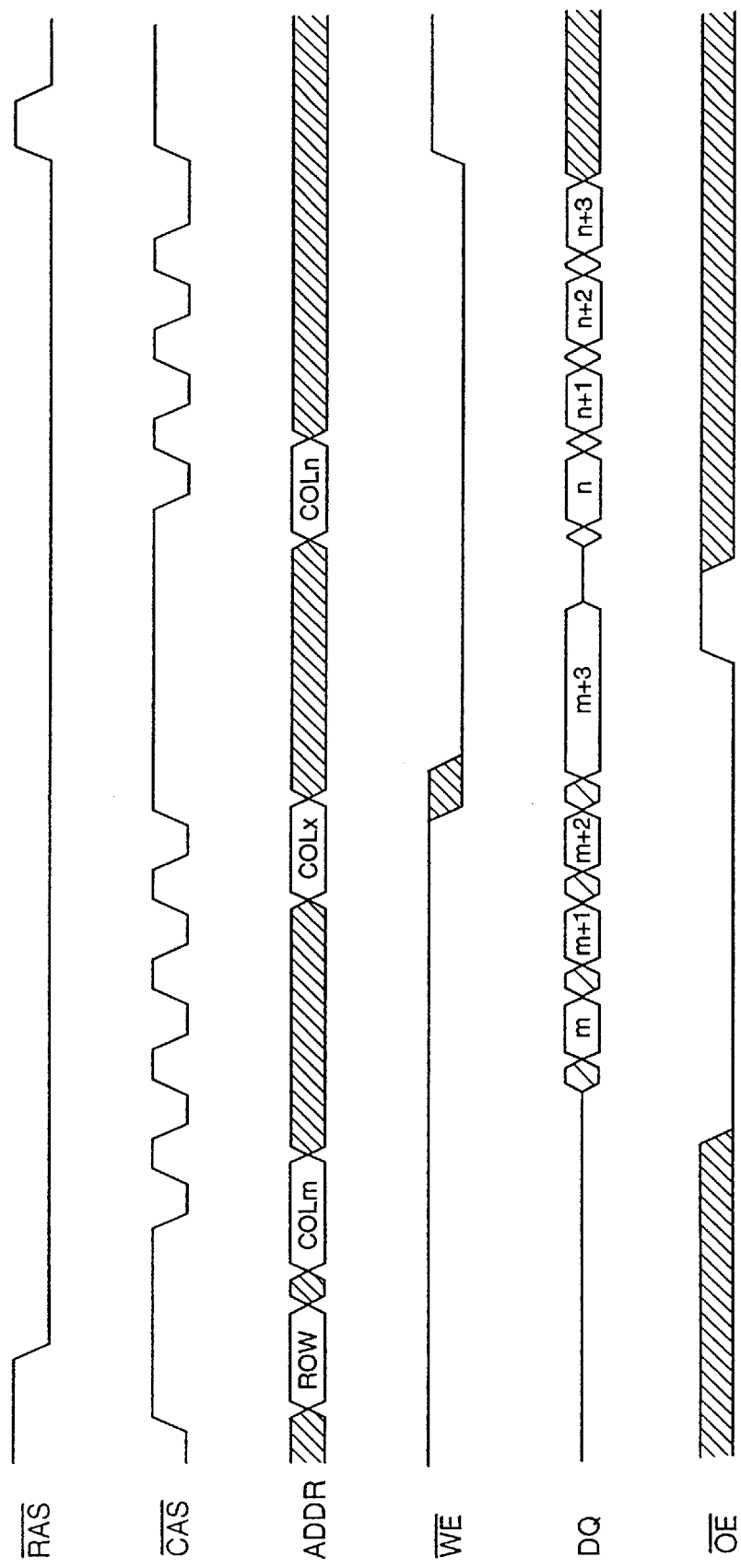
FIG. 3 is a timing diagram for performing a burst read followed by a burst write of the device of FIG. 1.

FIG. 3 is a timing diagram for performing a burst read followed by a burst write of the device of FIG. 1. In FIG. 3, a row address is latched by the RAS* signal. WE* would be low when RAS* falls for an embodiment of the design where the state of the WE* pin is used to specify a burst access cycle at RAS* time. Next, CAS* is driven low with WE* high to initiate a burst read access, and the column address is latched. The data out signals (DQ's) are not driven in the first CAS* cycle. On the second falling edge of the CAS* signal, the internal address generation circuitry advances the column address and begins another access of the array, and the first data out is driven from the device after a CAS* to data access time (tCAC). Additional burst access cycles continue, for a device with a specified burst length of four, until the fifth falling edge of CAS* which latches a new column address for a new burst read access. WE* falling in the fifth CAS* cycle terminates the burst access, and initializes the device for additional burst accesses. The sixth falling edge of CAS* with WE* low is used to latch a new burst address, latch input data and begin a burst write access of the device. Additional data values are latched on successive CAS* falling edges until RAS* rises to terminate the burst access.

Figure 4:
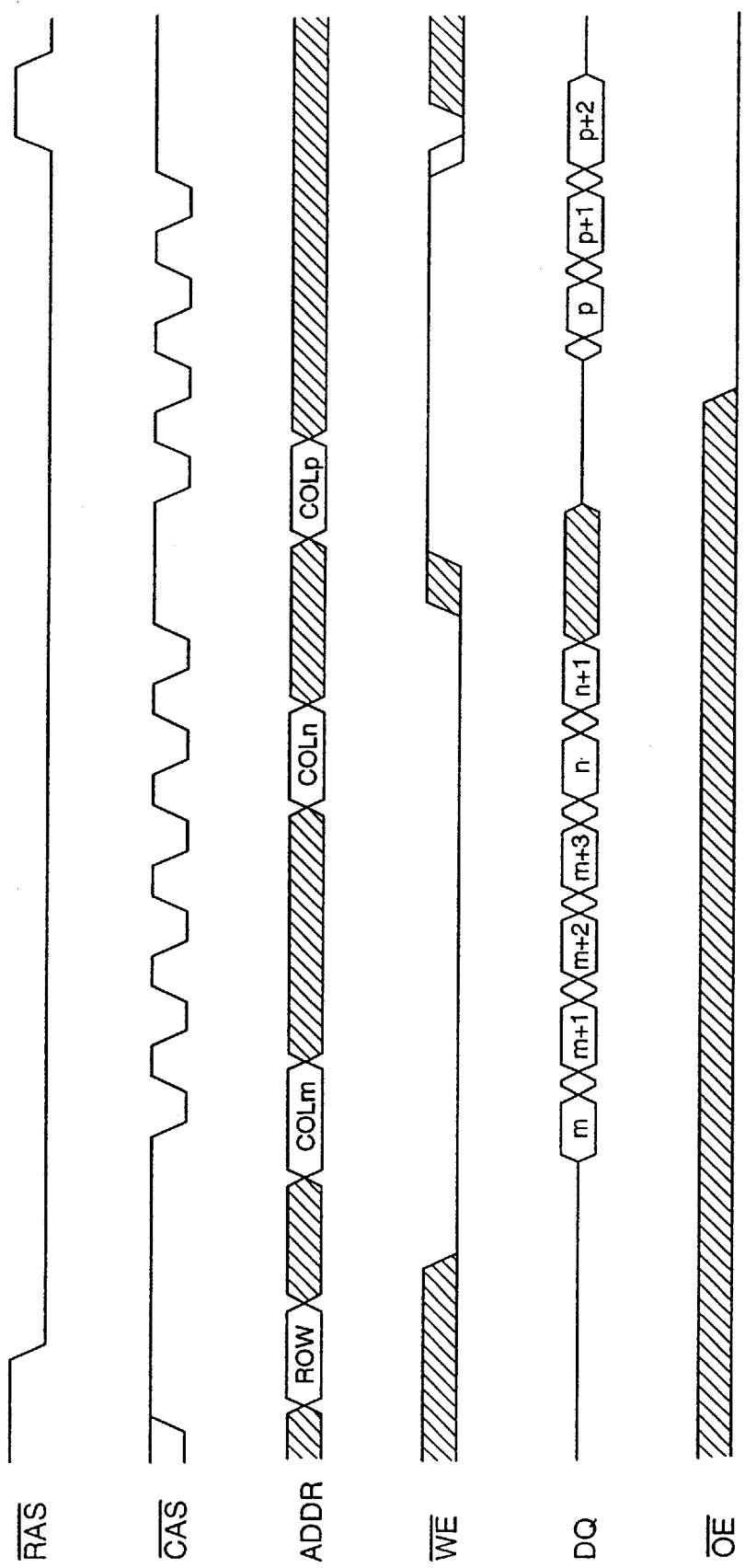
FIG. 4 is a timing diagram depicting burst write access cycles followed by burst read cycles of the device of FIG. 1.

FIG. 4 is a timing diagram depicting burst write access cycles followed by burst read cycles. As in FIG. 3, the RAS* signal is used to latch the row address. The first CAS* falling edge in combination with WE* low begins a burst write access with the first data being latched. Additional data values are latched with successive CAS* falling edges, and the memory address is advanced internal to the device in either an interleaved or sequential manner. On the fifth CAS* falling edge a new column address and associated write data are latched. The burst write access cycles continue until the WE* signal goes high in the sixth-CAS* cycle. The transition of the WE* signal terminates the burst write access. The seventh CAS* low transition latches a new column address and begins a burst read access (WE* is high). The burst read continues until RAS* rises terminating the burst cycles.

Continuous Burst Access

Figure 5:
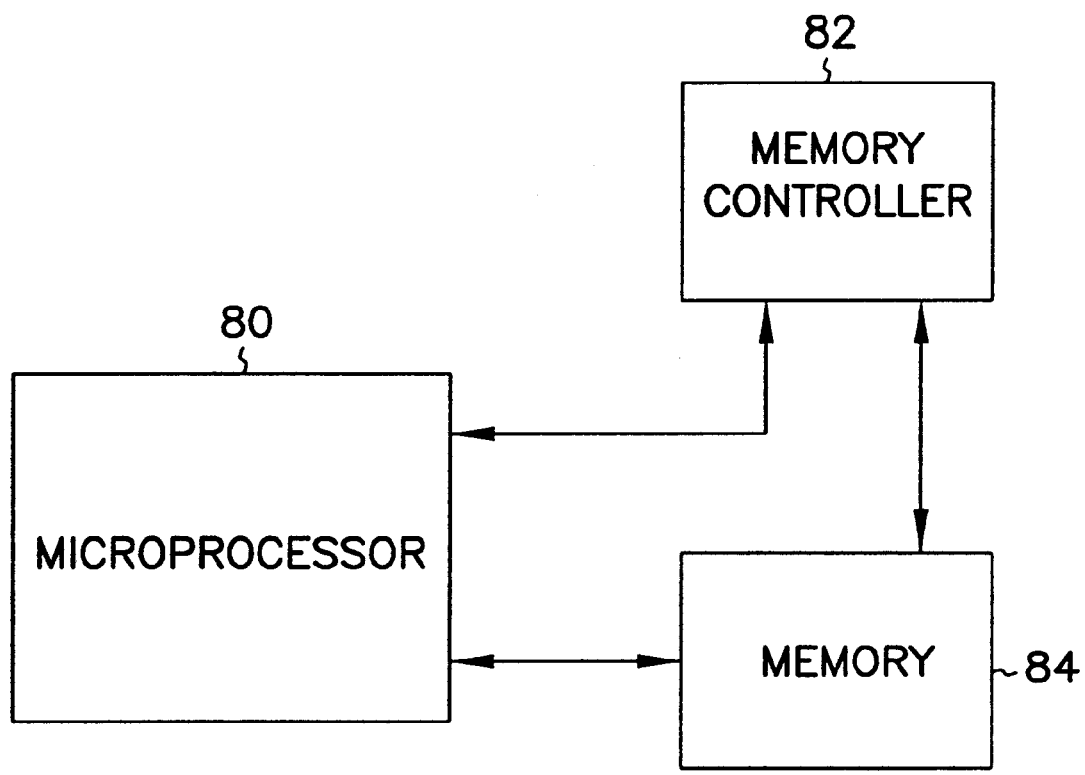
FIG. 5 illustrates a typical system of the present invention.

FIG. 5 illustrates a typical system application of the burst access memory described above. A microprocessor 80 and memory controller 82 are connected to the memory device 84. Memory device 84 may be any type of module, for example a single in-line memory module (SIMM), dual in-line memory module (DIMM), or a multi-chip module (MCM). The microprocessor communicates data with the memory device and provides instructions to the memory controller. It will be appreciated by those skilled in the art that a system using a burst memory may have to wait up to four CAS* cycles to read additional data from the memory. This delay is due to both latency and buffering. For example, in a four word burst access, two to four extra CAS* pulses may be required from the memory controller to communicate the last burst data to the microprocessor.

Figure 6:
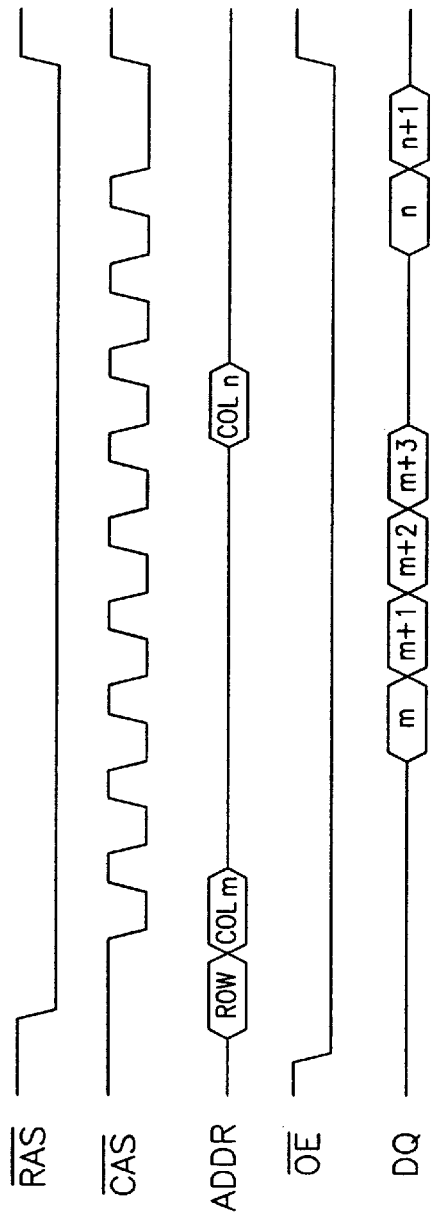
FIG. 6 is a timing diagram of successive read operations of a burst access memory.

If the data from a memory burst read is needed by the microprocessor to determine a new memory address, unnecessary delay may be experienced. That is, the time needed to initiate a new read operation after the termination of a prior read is avoidable delay. For comparison, FIG. 6 illustrates successive read operations of a burst access memory where the second read operation is not initiated until after the first read operation is complete. The burst access illustrated has a latency of three CAS* cycles. The data, therefore, is output from the memory starting on the third CAS* falling edge. A three cycle delay in output data is incurred following the end of the COLm data sequence and the beginning of the COLn data sequence.

The present invention includes memory controller 82 which initiates a read operation at a memory address determined to be the most likely next address to be requested by the microprocessor 80. The memory controller, therefore, anticipates the next address to be requested by the microprocessor. If the microprocessor requests data from the memory which corresponds to the new address determined by the memory controller, access time is saved. If the new memory address requested by the microprocessor is different from that determined by the memory controller, no additional access time is incurred by the system than would be required from a system not incorporating the present invention. The memory controller can include an address comparator which compares an address requested by the microprocessor and a new address generated by the memory controller. If the addresses are the same, the memory controller continues with the new burst read operation. If the address requested by the microprocessor is different from that produced by the memory controller, a new read operation is initiated at the address provided by the microprocessor. Alternatively, the microprocessor can be programmed such that the next address generated by the memory controller is known. This embodiment allows the microprocessor to use the new data without requesting a read operation. The burst memory 84 can include an address generation circuit which determines the next address to be requested by the microprocessor. The memory controller, therefore, does not determine the next address.

Continuous Read Operation

Figure 7:
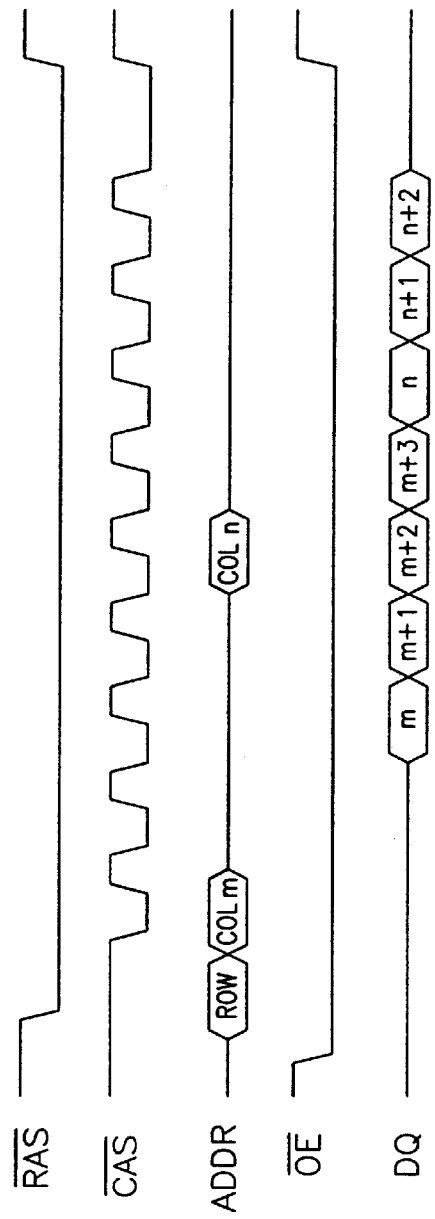
FIG. 7 is a timing diagram of successive read operations of the system of FIG. 5.

FIG. 7 is a timing diagram of a portion of a continuous burst read operation in accordance with a preferred embodiment of the present invention. A first column address (COLm) identified by the microprocessor 80 is provided to the memory 84. The first address is used as the starting address for the burst read operation. The internal address is advanced in either a sequential or interleaved manner as described above with reference to FIG. 2. The burst access illustrated has a latency of three CAS* cycles. The data is burst read from the memory starting on the third CAS* falling edge. A new column address (COLn) is provided on the address lines by the memory controller 82 on the fifth CAS* cycle. A data sequence originating at the new column address is burst out starting on the seventh CAS*, incurring no data output delay. The microprocessor 80 can request data from the memory controller between the fifth and eighth CAS* cycle without incurring a delay. If the microprocessor requests data from an address different than the address generated by the memory controller, data provided on the DQ lines is ignored by the microprocessor until the microprocessor's new address is accessed. A latency delay will be experienced similar to that shown in FIG. 6.

It will be appreciated by those skilled in the art, that the present invention can include an address generator internal to the memory control circuitry 38 which produces a new column address if a valid new address is not provided on the external address lines. To assist the memory controller, the output enable (OE*) input can be used to indicate the presence of a valid address on the address lines. Further, additional counter circuitry can be added to the memory to enable the memory to output a full length column sequence.

The column address generated in the absence of a request by the microprocessor can be determined in any number of ways. The new address can be produced by repeating the prior sequence with an advanced most significant bit, as shown in Tables 1 where X represents address most significant bits (MSB's) followed by bits A1 and A0. In Table 1 an interleaved address sequence is shown for a burst length of 4. The next burst sequence start address is derived by incrementing the MSB's (X) and by repeating the initial LSB's (A1, A0). In Table 2 the next burst sequence start address is derived by incrementing the MSB's and resetting the LSB's to 0, 0. Either of these methods may be utilized for other burst length options, and for other addressing sequences.

TABLE 1

| START ADDRESS | NEXT ADDRESS |
|---|---|
| X 0 1 | (X + 1) 0 1 |
| X 0 0 | (X + 1) 0 0 |
| X 1 1 | (X + 1) 1 1 |
| X 1 0 | (X + 1) 1 0 |

TABLE 2

| START ADDRESS | NEXT ADDRESS |
|---|---|
| X 0 1 | (X + 1) 0 0 |
| X 0 0 | (X + 1) 0 1 |
| X 1 1 | (X + 1) 1 0 |
| X 1 0 | (X + 1) 1 1 |

An alternate method of bursting data in the absence of a request by the microprocessor is a full page burst access. That is, the memory outputs data from the full memory page starting at the address next column address.

Figure 8:
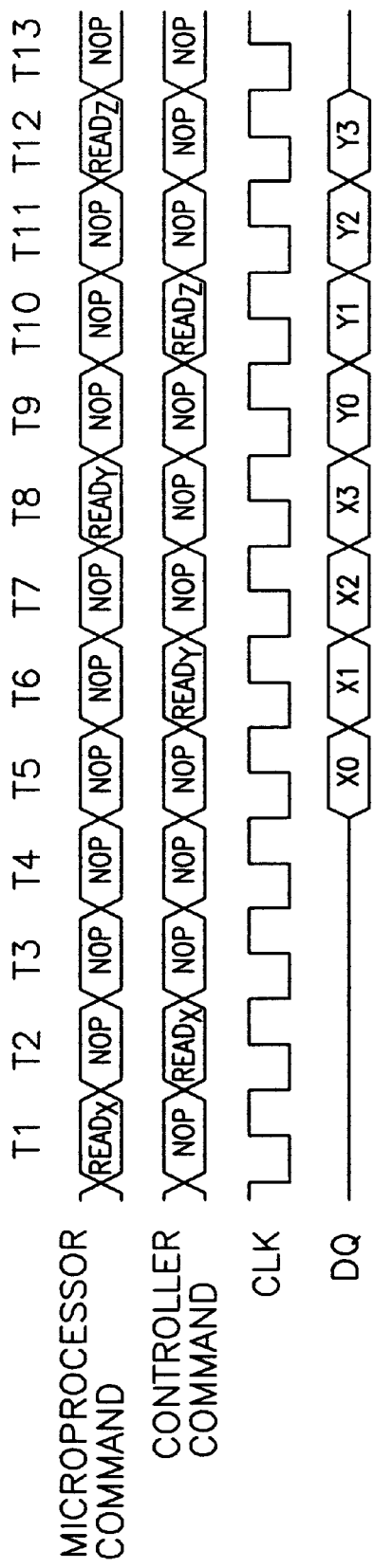
FIG. 8 is a timing diagram of an operation of an SDRAM used in the system of FIG. 5.

FIG. 8 illustrates one operation of the system of an SDRAM which can be used in the system of FIG. 5. For a detailed description of a SDRAM see 1995 DATA SHEET 16M DRAM, provided by Samsung Electronics and incorporated herein by reference. At time t1, the microprocessor 80 issues a read command for column X. At time t2 controller 82 issues a read command to the memory 84 for column X. The memory in this illustration has a latency of 3 and burst length of 4. Data from column X is valid from time t5 to t8. At time t6, the memory controller issues an anticipatory read command for column address Y. At time t8 the microprocessor issues a read command for column address Y. Valid data from column Y is provided from time t9 to t12.

Figure 9:
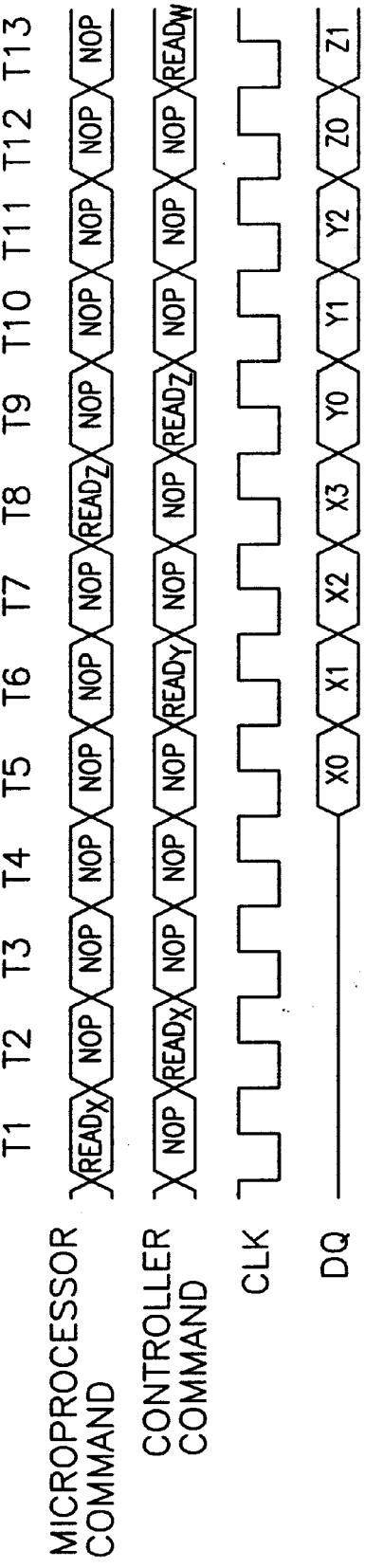
FIG. 9 is a timing diagram of another operation of the SDRAM of FIGS. 5.

Referring to FIG. 9, at time t1, the microprocessor 80 issues a read command for column X. At time t2 controller 82 issues a read command to the memory 84 for column X. The memory in this illustration has a latency of 3 and burst length of 4. Data from column X is valid from time t5 to t8. At time t6, the memory controller issues an anticipatory read command for column address Y. At time t8 the microprocessor issues a read command for column address Z. Valid data from column Y is provided from time t9 to t11. Valid data from column Z is provided starting at time t12.

It will be appreciated that in the operation of FIG. 8 three clock cycles are saved by correct anticipation of the next read address. In the operation illustrated in FIG. 9, the data from column Y is ignored while the microprocessor waits for data from column Z.

CONCLUSION

A system has been described which uses a burst access memory and a memory controller to anticipate the memory address to be used in future data read operations as requested by a microprocessor. Either the memory controller or the memory device initiates a burst read operation starting at a memory address generated thereby. The microprocessor can, therefore, wait to initiate a data read without suffering a time delay. The new address is generated in a predetermined pattern. The memory controller can include a comparator to compare an address provided by the microprocessor with the predetermined address. The memory controller can thereby ignore a read request from the microprocessor which corresponds to the generated address. Alternately, the microprocessor can withhold a request if the correct address has been initiated by the memory controller.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, synchronous DRAMs can be used in place of the burst access memory device without departing from the present invention. Therefore, it is manifestly intended that this invention be limited only by the claims and the equivalents thereof.

What is claimed is:

1. A system comprising:

a synchronous memory device having addressable memory cells, the synchronous memory device is adapted to access a sequence of memory cells in response to an externally provided start address;

a microprocessor coupled to the synchronous memory device for data communication with the addressable memory cells, the microprocessor further initiating a first data read operation at a first memory cell address; and a memory controller provided in the synchronous memory device which is connected to the microprocessor, the memory controller producing a second start address in response to the externally provided start address and initiating a read operation in anticipation of a second data read operation at a new memory cell start address provided from the microprocessor, such that data stored at the second start address is output on an external data communication connection of the synchronous memory device following data output by the first data read operation to maintain an active data output stream between the first data read operation and a second data read operation requested by the microprocessor at the new memory cell start address for each first data read operation.

2. The system of claim 1 wherein the second start address and the new memory cell start address are the same.

3. The system of claim 1 wherein the memory controller includes a comparator circuit for comparing the second memory cell address and the new memory cell address, and producing an output in response thereto.

4. The system of claim 1 wherein the second memory cell address is produced using an interleaved sequence.

5. The system of claim 1 wherein the microprocessor withholds the new memory cell start address if the second start address and the new memory cell start address are the same.

6. The system of claim 1 wherein the synchronous memory device is a burst extended data out dynamic random access memory (BEDO DRAM).

7. A system comprising:

a microprocessor;

a burst access memory having addressable memory cells for providing data from a series of memory cells in response to a first read request from the microprocessor, the read request including a first start memory cell address; and address generation circuitry included in the burst access memory for generating a second start memory cell address in response to the first start memory cell address and initiating a burst read operation in anticipation of a second read request from the microprocessor, such that data stored at the second start address is output on an external data communication connection of the burst access memory following data output by the first read request to maintain an active data output stream between the first read request and a second read request by the microprocessor at a new memory cell start address for each first read request.

8. The system of claim 7 wherein the burst access memory includes a comparator circuit for comparing the generated second start memory cell address and a memory cell address provided by the microprocessor.

9. The system of claim 7 wherein the microprocessor withholds a request for data stored at a new memory cell address if the generated second start memory cell address is equal to the new memory cell address.

10. The system of claim 7 wherein the burst access memory includes full page length column sequence circuitry for outputting data stored at each column of a page of memory.

11. A synchronous memory device comprising:

an array of addressable memory cells arranged in rows and columns, each of the addressable memory cells for storing a data bit;

address circuitry for receiving an externally provided start address; and control circuitry for managing a read operation and outputting a burst of data bits from the array of addressable memory cells, the burst of data comprising a plurality of data bits read from an interleaved sequence of addressable memory cells starting at a first externally provided start address;

the control circuitry further comprising means for initiating a subsequent burst output, the subsequent burst output comprising a plurality of data bits read from an interleaved sequence of addressable memory cells starting at an internally generated start address, the internally generated start address is generated in response to the externally provided start address and in anticipation of a second externally provided start address, such that data stored at the internally generated start address is output on an external data communication connection of the synchronous memory device following data output by a first read operation at the first externally provided start address to maintain an active data output stream between the first read operation and a second read operation requested by receiving the second externally provided address for each read operation.

12. The synchronous memory device of claim 11 further comprising:

address counter circuitry for generating an interleaved sequence of memory cell addresses in response to the externally provided start address and the internally generated start address.

13. The synchronous memory device of claim 11 further comprising:

an address generator circuit for producing the internally generated start address in anticipation of a second externally provided start address.

14. A method of continuously outputting data from a synchronous memory device, the method comprising:

providing a first read request from a microprocessor, the first read request including a first memory cell start address for the synchronous memory device;

initiating a read operation using a memory controller provided in the synchronous memory device in response to the first read request;

outputting a series of data from the synchronous memory device in response to the memory controller;

using the memory controller, generating a new memory start address in response to the first memory cell start address and in anticipation of a second read request from the microprocessor, the second read request including a second memory cell start address; and initiating a second read operation and outputting data from the synchronous memory device starting at the new memory start address, such that data stored at the new memory start address is output on an external data communication connection of the synchronous memory device following data output by the first read request to maintain an active data output stream between the first read request and a second read request by the microprocessor at the second memory cell start address for each first read request.

15. The method of claim 14 wherein generating a new memory start address is performed using the synchronous memory device.

16. The method of claim 15 further including:

outputting a full column data sequence from the synchronous memory device.

17. The method of claim 14 further including:

withholding the second read request from the microprocessor if the new memory start address is equal to the second memory cell start address.

18. The method of claim 14 wherein the new memory start address is generated using an interleaved sequence.

19. The method of claim 14 wherein the synchronous memory device is a burst extended data out dynamic random access memory (BEDO DRAM).

20. The method of claim 14 further including:

providing a second read request from the microprocessor, the second read request including a second memory cell start address, the second memory cell address being different than the new memory cell start address; and initiating a second read operation and outputting data from the synchronous memory device starting at the second memory address.

* * * * *

UNITED STATES PATENT AND TRADEMARK OFFICE
CERTIFICATE OF CORRECTION

PATENT NO. : 6,401,186 B1
DATED : June 4, 2002
INVENTOR(S) : Greg A. Blodgett

It is certified that error appears in the above-identified patent and that said Letters Patent is hereby corrected as shown below:

<u>Title page,</u>
Item [74], insert -- & -- after "Woessner".
Item [56], U.S. PATENT DOCUMENTS, insert the following U.S. patent documents:

| | | | |
|---|---|---|---|
| -- 4,355,377 | 10/1982 | Sud, R., et al. | 365/203 |
| 4,510,603 | 04/1985 | Catiller, R.D. | 371/21 |
| 4,513,389 | 04/1985 | Devchoudhury, R.N. | 364/900 |
| 4,750,839 | 06/1988 | Wang, C., et al. | 365/233 |
| 4,766,431 | 08/1988 | Kobayashi, Y., et al. | 340/799 |
| 4,799,199 | 01/1989 | Scales, H.L., et al. | 365/230 |
| 4,847,758 | 07/1989 | Olson, A.M., et al. | 364/200 |
| 4,933,910 | 06/1990 | Olson, A.M., et al. | 365/238.5 |
| 4,984,217 | 01/1991 | Sato, K. | 365/230 |
| 4,993,027 | 02/1991 | McGraw, J.M., et al. | 371/16.2 |
| 5,175,835 | 12/1992 | Beighe, E.W., et al. | 395/425 |
| 5,307,320 | 04/1994 | Farrer, S.M., et al. | 365/230.01 |
| 5,327,390 | 07/1994 | Takasugi, A. | 365/230 |
| 5,331,593 | 07/1994 | Merritt, T.A., et al. | 365/189.11 |
| 5,335,336 | 08/1994 | Kametani, M. | 395/425 |
| 5,339,276 | 08/1994 | Takasugi, A. | 365/230 |
| 5,363,330 | 11/1994 | Kobayashi, S., et al. | 365/185 |
| 5,369,622 | 11/1994 | McLaury | 365/233 |
| 5,386,385 | 01/1995 | Stephens, Jr., M.C. | 365/189.05 |
| 5,400,292 | 03/1995 | Fukiage, T., et al. | 365/230.010 |
| 5,436,869 | 07/1995 | Yoshida, K. | 365/230 |
| 5,449,941 | 09/1995 | Yamazaki, S., et al. | 257/411 |
| 5,487,049 | 01/1996 | Hang, C. | 365/221 |
| 5,561,814 | 10/1996 | Glew, A.F., et al. | 395/833 |
| 5,598,376 | 01/1997 | Merritt, T.A., et al. | 365/230.06 |
| 5,640,364 | 06/1997 | Merrit, T., et al. | 365/233.5 |
| 5,652,724 | 07/1997 | Manning, T.A. | 365/189.05 |
| 5,706,247 | 01/1998 | Merritt, T., et al. | 365/233.51 |
| 5,713,011 | 01/1998 | Satoh, J., et al. | 395/556 |
| 5,748,560 | 05/1998 | Sawada, S. | 365/233 |
| 5,752,269 | 05/1998 | Divivier, R.J., et al. | 711/169 |
| 5,754,838 | 05/1998 | Shibata, K., et al. | 395/559 |
| 5,812,490 | 09/1998 | Tsukude, M., et al. | 365/233 |
| 5,831,924 | 11/1998 | Nitta, Y., et al. | 365/230.03 |
| 5,903,514 | 05/1999 | Sawada, S. | 365/233 |
| 5,953,278 | 09/1999 | McAdams, H.P., et al. | 365/219 |
| 5,966,724 | 10/1999 | Ryan, K.J. | 711/105 |
| 6,069,839 | 05/2000 | Pancholy, A., et al. | 365/233 -- |

UNITED STATES PATENT AND TRADEMARK OFFICE
CERTIFICATE OF CORRECTION

PATENT NO. : 6,401,186 B1
DATED : June 4, 2002
INVENTOR(S) : Greg A. Blodgett

It is certified that error appears in the above-identified patent and that said Letters Patent is hereby corrected as shown below:

FOREIGN PATENT DOCUMENTS, insert the following foreign patent documents:
-- EP    0468480    01/29/1992    G11C7/00
PCT   96/20482    07/04/1996    G11C7/00 --
OTHER PUBLICATIONS, insert the following publications:
-- "16MS DRAM Schematics", Micron Technology, pp. 1-58, (February 1993)

"2Mx8 Synchronous DRAM Schematics, Rev. 1.9", Micron Technology, pp. 357495-357595, (December 1995)

"2Mx8 Synchronous Dram Schematicsm, Rev. 1.5", Micron Technology, pp. 1-85, (May 1994)

1996 Dram Data Book, Micron Technologies, Inc., pp. 5-75, 7-62, (1996)

"4M DRAM", Toshiba American Electronic Components, Inc., pp. A-137- A-159, (1991)

"Application Specific DRAM", Toshiba American Electronic Components, Inc., C-178, C-260, C-218, (1994)

"Command Truth Table", NEC, 1 page, (1993)

"DRAM 1 Meg x 4 DRAM 5VEDO Page Mode", 1995 DRAM Data Book, Micron Technology, Inc., 1-1 thru 1-30, (1995)

"Hyper Page Mode DRAM", Electronic Engineering, 66, Woolwich, London, GB, pp. 47-48, (September 1994)

"KM48SV2000 Preliminary CMOS SDRAM", Samsung Electronics, pp. 7-8, (March 1993)

McAlexander, J.C., Third Supplemental Expert Report, In the U.S District Court for the District of Delaware; Mosel Vitelic Coporation, Plaintiff, v. Micron Technology, Inc., Defendant; Micron Technology Inc., Counter-Plaintiff, v. Mosel Vitelic Corporation and Counter-Defendants; No. 98-449-GMS, pp. 1-28, (1998)

"Mitsubishi Samples 16M Synch DRAM", Electronic News, pp. 3-4, (1993)

"S3 Burst Mode DRAM", S3 Incorporated, Santa Clara, CA, 2 pages, (June 1993)

"SAMSUNG SYNCHRONOUS DRAM", Samsung Electronics, Revision 1, pp. 1-16, (March 1993)

UNITED STATES PATENT AND TRADEMARK OFFICE
CERTIFICATE OF CORRECTION

PATENT NO. : 6,401,186 B1
DATED : June 4, 2002
INVENTOR(S) : Greg A. Blodgett

It is certified that error appears in the above-identified patent and that said Letters Patent is hereby corrected as shown below:

"Synchronous DRAM 2 MEG x 8 SDRAM", <u>Micron Semiconductor, Inc.</u>, pp. 2-3 - 2-6, (April 1994)

Gowni, S.P., et al., "A 9NS, 32K X 9, BICMOS TTL Synchronous Cache RAM With Burst Mode Access", <u>IEEE Custom Integrated Circuits Conf</u>, pp. 781-784, (1992)

Oki, "Burst DRAM Function and Pinout, 128KX16/256KX16", <u>Oki Electric Ind. Co., Ltd., 2nd presentation, Item #619</u>, 1-4, (1994) --

U.S. PATENT DOCUMENTS, reference "5,610,864", delete "10/1997" and insert -- 03/1997 --, therefor.
OTHER PUBLICATIONS, reference "1995 DRAM Data Book", insert -- (1995) -- after "4-42".
Reference "Integrated Circuit Technical Data", delete "x8" and insert -- x 8 --, therefor.
Reference "Synchronous", delete "x4" and insert -- x 4 --, therefor.

<u>Column 1,</u>
Line 44, delete "ay" and insert -- may --, therefor.

<u>Column 3,</u>
Line 1, delete "Megx8" and insert -- Meg x 8 --, therefor.
Line 6, delete "A16" and insert -- A10 16 --, therefor.

<u>Column 9,</u>
Line 56, insert -- start -- after "provided".
Line 56, insert -- first -- after "each".

Signed and Sealed this

Eleventh Day of March, 2003

JAMES E. ROGAN
*Director of the United States Patent and Trademark Office*